June 19, 1962   P. F. McDONOUGH   3,039,403
OVERHEAD CONNECTING TRACK WITH CONTROL
Filed March 22, 1961   6 Sheets-Sheet 1
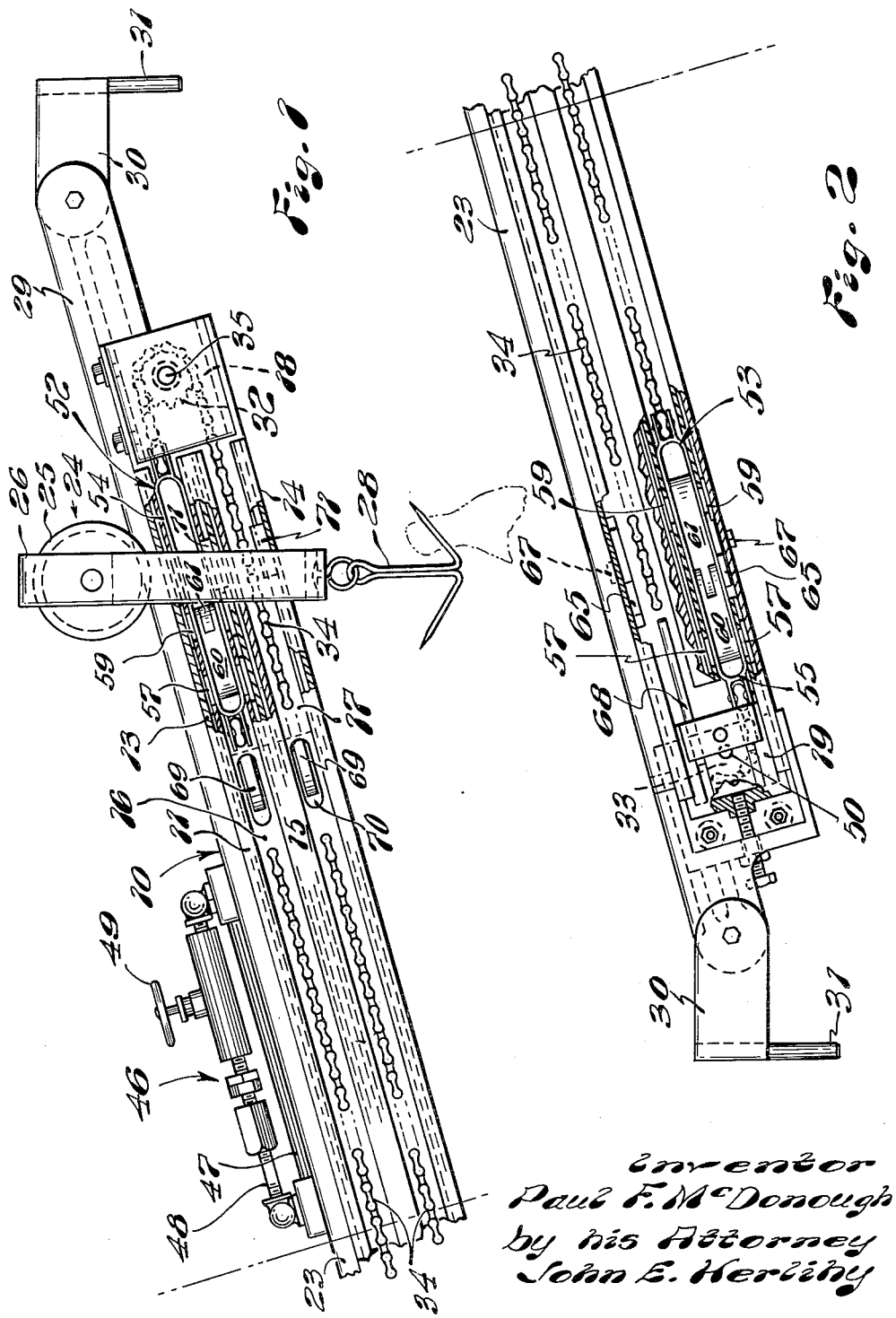
Inventor
Paul F. McDonough
by his Attorney
John E. Herlihy

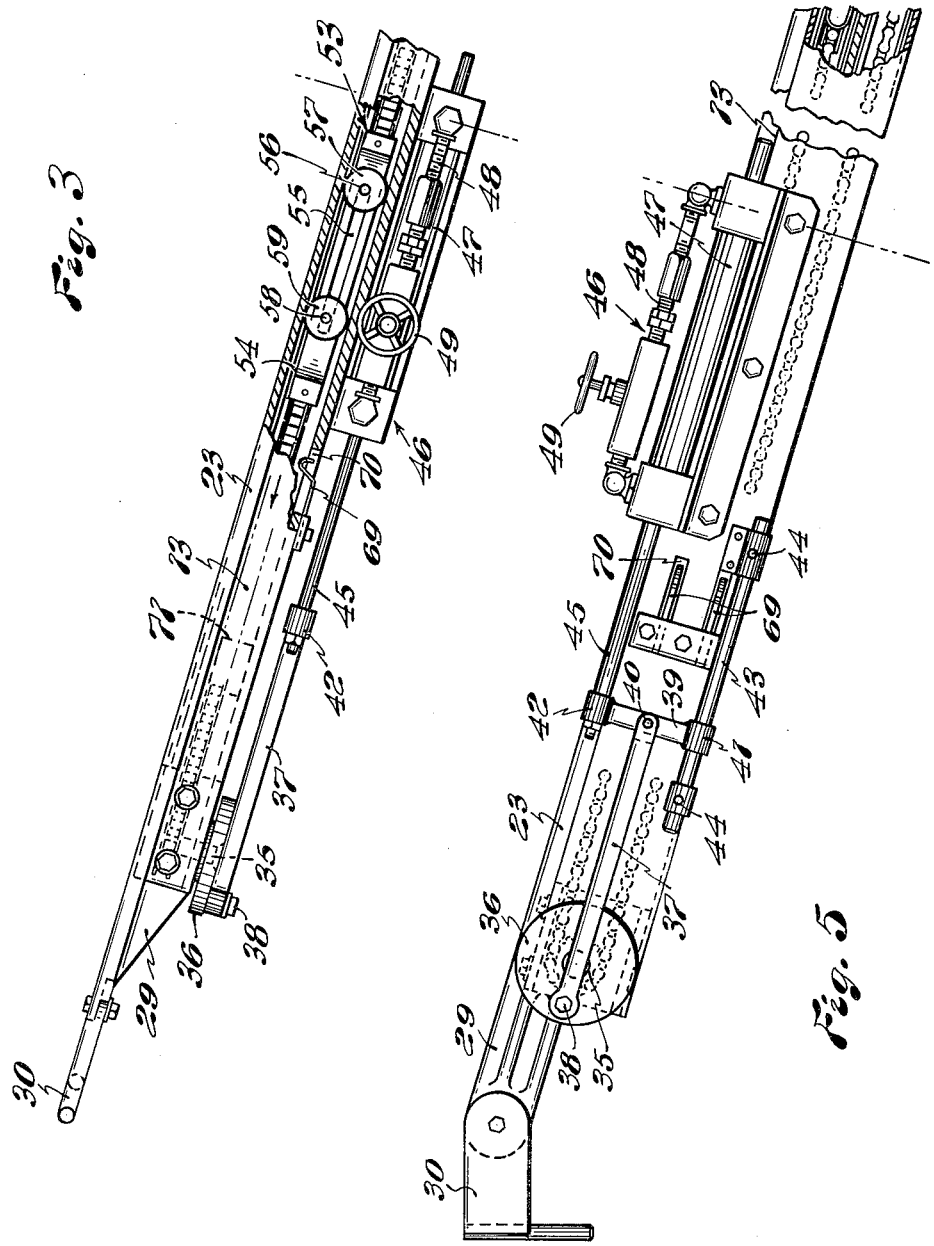

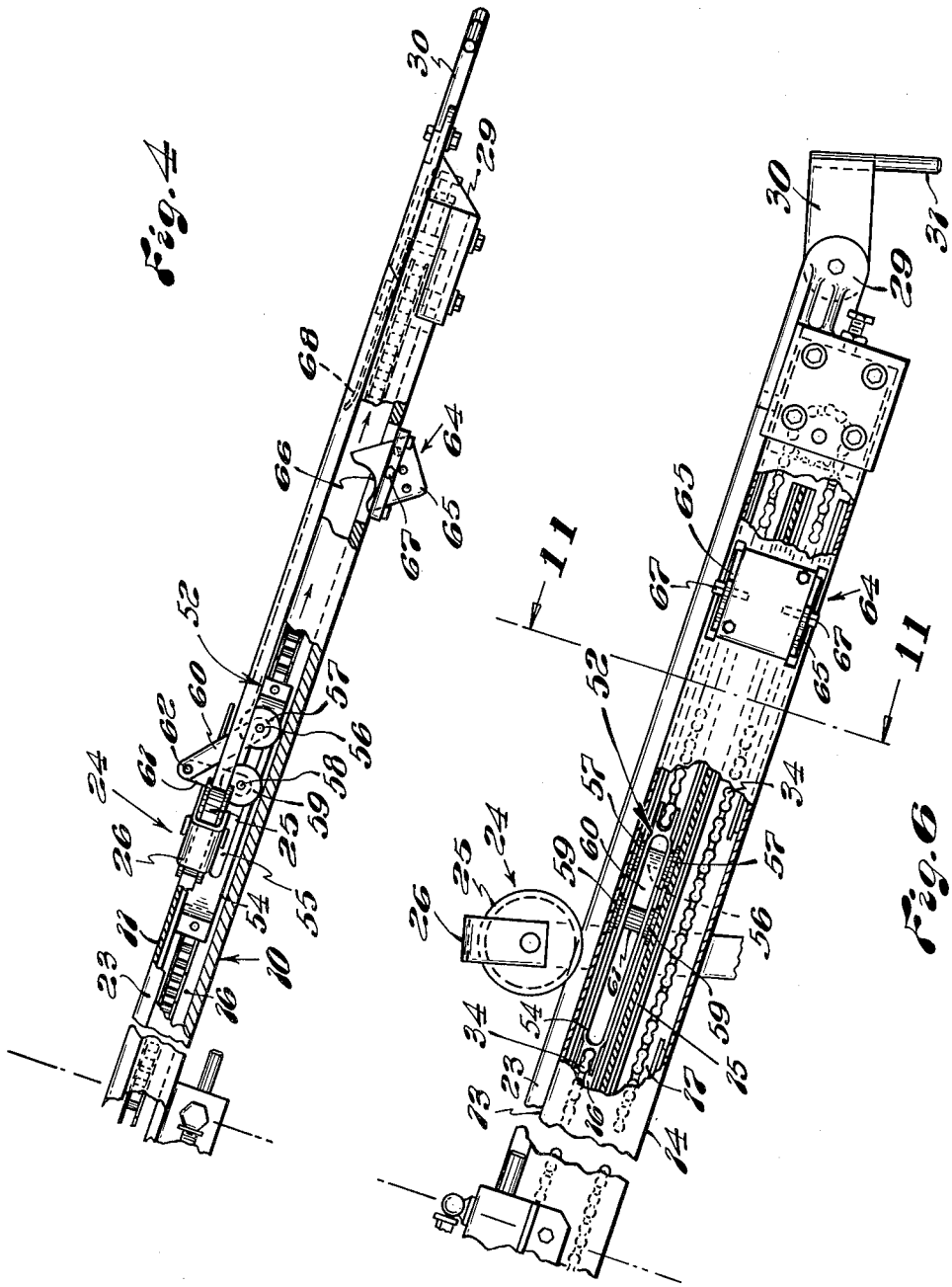

June 19, 1962    P. F. McDONOUGH    3,039,403
OVERHEAD CONNECTING TRACK WITH CONTROL
Filed March 22, 1961    6 Sheets-Sheet 4
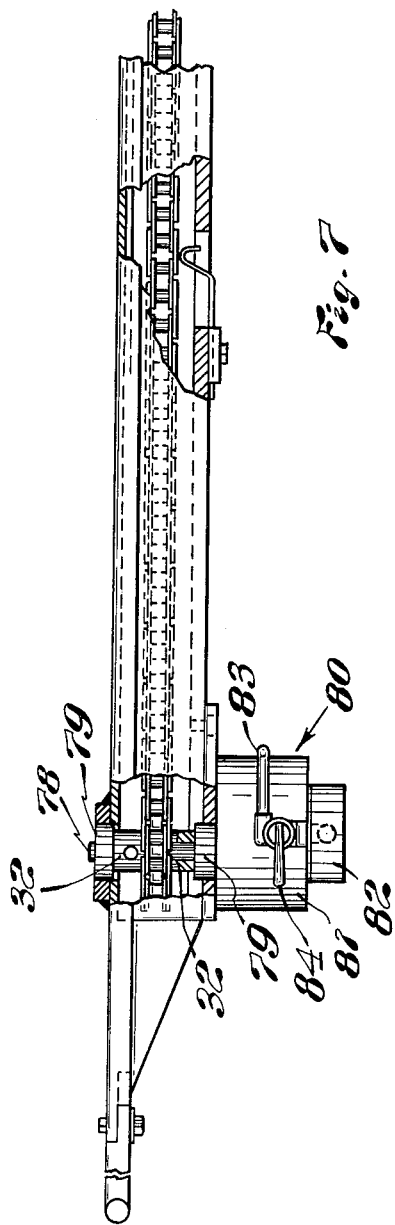
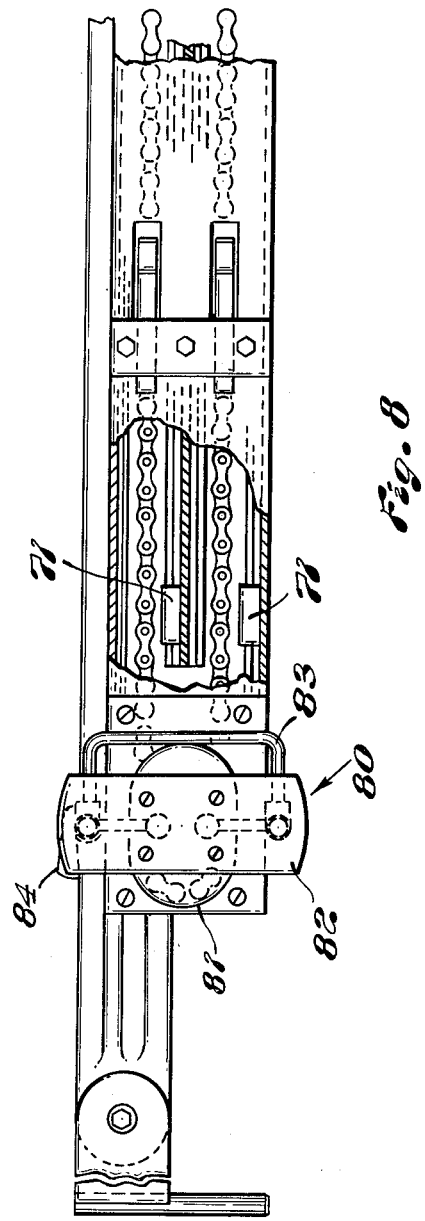
Inventor
Paul F. McDonough
by his Attorney
John E. Herlihy June 19, 1962  P. F. McDONOUGH  3,039,403
OVERHEAD CONNECTING TRACK WITH CONTROL
Filed March 22, 1961  6 Sheets-Sheet 5
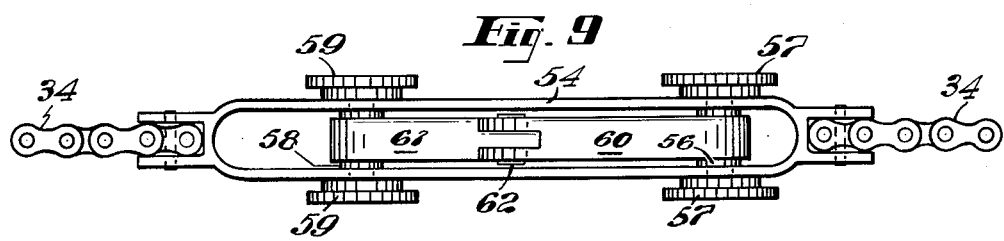
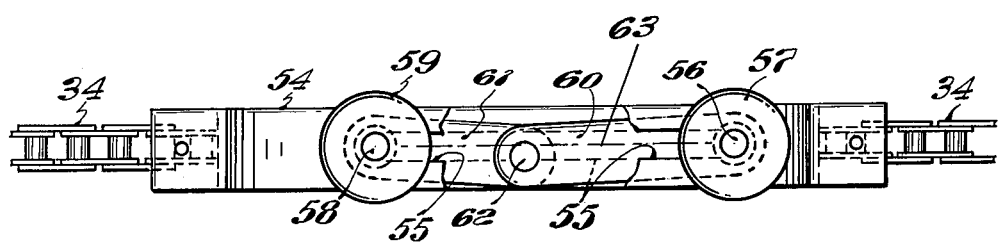
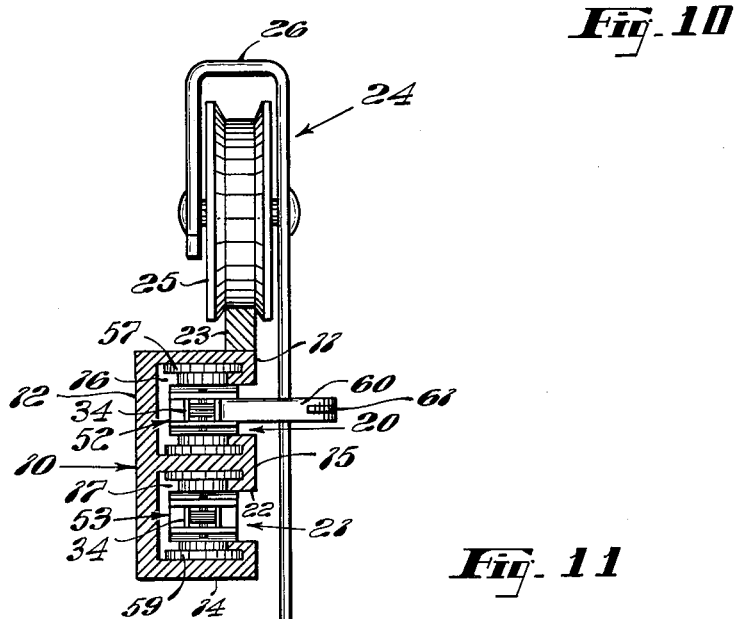
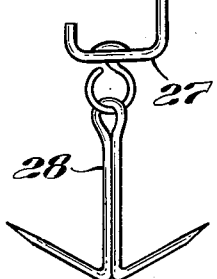
Inventor
Paul F. McDonough
by his Attorney
John E. Herlihy United States Patent Office 3,039,403
Patented June 19, 1962

3,039,403
OVERHEAD CONNECTING TRACK WITH CONTROL
Paul F. McDonough, 159 Warren Ave., Milton, Mass.
Filed Mar. 22, 1961, Ser. No. 97,491
10 Claims. (Cl. 104—178)

This invention relates to overhead monorail systems and more particularly to monorail systems for the transport of animal carcasses.

A primary object of the present invention is to provide a novel overhead monorail system for easily and safely conveying or transporting animal carcasses or other products from one elevation to a lower elevation or location.

Another object of the present invention is to provide a novel overhead monorail system which is adapted to control the rate of descent or downward transport of, for example, animal carcasses.

Still another object of the invention is to provide a portable overhead monorail system which is adapted for use in the loading or unloading of vehicles such as refrigerated trucks utilized, for example, for the haulage of meat carcasses.

Other objects of the invention will in part be obvious and will in part appear hereinafter.

For a fuller understanding of the nature and objects of the invention, reference should be had to the following detailed description taken in connection with the accompanying drawings wherein:

FIGURES 1 and 2 are fragmentary views which when taken together illustrate a front side view of the overhead monorail apparatus of the invention, the apparatus being shown in partial broken-away sections to reveal means for controlling the transport of a descending animal carcass carried by a suitable wheel hook assembly.

FIGURES 3 and 4 are fragmentary views which when taken together illustrate a top view of the overhead monorail apparatus of FIGURES 1 and 2 showing, however, the carriage assemblies at different loctions along the paths of travel than the locations in FIGURES 1 and 2.

FIGURES 5 and 6 are fragmentary views which when taken together illustrate a back-side view of the overhead monorail apparatus of the invention.

FIGURE 7 is a fragmentary top view section of the overhead monorail apparatus of the invention, the apparatus being shown with partial broken away sections to reveal another embodiment for controlling the transport of a descending animal carcass.

FIGURE 8 is a fragmentary back-side view section of the overhead monorail apparatus of the invention showing additional aspects of the embodiment set forth in FIGURE 7.

FIGURE 9 is a front-side view of a carriage assembly showing the arms in the collapsed position.

FIGURE 10 is a top view of a carriage assembly which is, in part, broken away to show the preferred position of the arms upon releasing the wheel hook assembly and animal carcass carried thereby.

FIGURE 11 is a cross-section taken along the line 11—11 of FIGURE 6.

Figure 12:
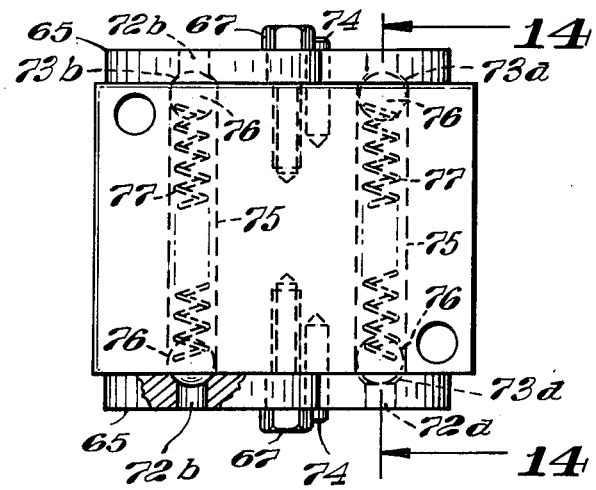
FIGURE 12 is a back-side view of the stop member for collapsing the arms of the carriage assembly.

There are many instances where it is necessary to transport, for example, animal carcasses weighing several hundred pounds each over an appreciable distance from one height or location to a lower place or location. For instance, it may be necessary to move animal carcasses from one floor to a lower floor of a packing plant or warehouse or to move animal carcasses from the body of a vehicle used for the transport of meat to the storage entrance of, say, a retail store which is generally appreciably lower than the vehicle body. Heretofore, much of such movement of carcasses was accomplished by manual labor which is quite undesirable, since it frequently entails high labor cost, prolonged moving times, and possible injuries to workers, such as serious back strains and the like. These disadvantages will be more clearly shown by a consideration of, for example, the unloading of a meat hauling vehicle or van at a retail store. The normal procedure of meat carcass haulage is that of suspending meat carcasses from an overhead rail system within the vehicle body. The vehicle, generally of the refrigerated type, is brought to the point of unloading and the carcasses are manually removed from the overhead rail system and carried to the tail or end section of the vehicle body, where they are dropped or laid. The carcasses are then manually removed from the vehicle tail section and carried within the storage entrance or refrigerator of the retail store and there manually lifted and secured to the overhead rail system employed by the store. Said manual movement of heavy meat carcasses frequently is accompanied by undesirable bruising of the meat due to dropping or striking the meat carcasses. The bruised areas which toughen the meat often must be removed before sale, thus resulting in meat losses. Moreover, because meat carcasses usually weigh several hundred pounds each, improper handling thereof, particularly by the inexperienced handler, may result in serious back injury or other strains or injuries. Thus, not only may a worker become seriously injured, but such injury may result in increased hospitalization and disability payments on the part of the employer. Furthermore, such manual unloading procedures may require substantial time delays for the delivery vehicle and substantially greater amounts of manual labor. For example, the manual unloading of a great number of meat carcasses, say at a super-market by a few handlers, results in tying up the delivery vehicle for a prolonged period of time. The use of greater numbers of handlers to expedite or hasten the unloading may result in increased labor costs.

There has long been a need of an overhead monorail system for rapidly, economically and safely transporting animal carcasses or other products from one elevation to a lower elevation or location. In the movement of meat carcasses between a carcass hauling vehicle and the storage or refrigerator areas of a warehouse, retail store or the like, there is particularly needed a portable overhead monorail system which can be readily attached both to the elevated overhead monorail system of the vehicle and to the lower overhead monorail system of the receiving store, etc., and which can be easily removed when meat carcasses are not being transported. Moreover, in such a portable overhead monorail system bridging the space between two other overhead monorail systems of different elevations, there is also needed means for controlling the rate of descent or downward movement of the heavy carcasses in order to prevent undesirable damage to the carcasses and serious injury to workers. In the present invention there is provided a compact, portable overhead monorail system which is adapted to control the downward rate of travel of animal carcasses so as to permit the easy and fast movement of such carcasses on the original wheel hook assembly between two overhead monorail systems which are at different elevations or heights. The overhead monorail assembly of the present invention (a) permits faster unloading, thus saving time and avoiding delivery truck delays, (b) requires fewer handlers for unloading, thus saving labor, (c) does not require manual handling of the heavy carcasses, thus avoiding worker injury, (d) insures that the prime condition of the carcasses is maintained during unloading, and (e) provides substantial monetary savings due to the savings resulting from the above mentioned aspects.

The apparatus of the present invention capable of achieving the advantages mentioned above broadly comprises an elongated structural member having a pair of longitudinal slots or openings along one side thereof, said member having a monorail fastened along the entire length of the upper side of said member. Included within said structural member is an assembly comprising a pair of spaced sprockets and a chain therearound, said assembly providing an elongated path of travel. One of said sprockets is suitably connected to a hydraulic or pneumatic system so that the rate or speed of the travel of said chain may be closely controlled. Included within said chain is a pair of carriage means, each carriage means comprising a pair of arms which may be erected so as to extend through and beyond said longitudinal side slots to be engaged by the bracket of a suitable wheel hook assembly or collapsed so as to release said wheel hook assembly, said carriage means being spaced in said chain so that when one having its pair of arms in the erected position is at the beginning of the path of travel, the other having its pair of arms in the collapsed position is at the end of the path of travel. Means for erecting and collapsing the arms of said carriage means are suitably associated with said structural member.

Referring now to the drawings, wherein like members refer to like elements or parts there is shown an elongated structural member 10, illustrated here as being of a substantially rectangular shape and comprising a front side 11, a back side 12, an upper or top side 13 and a lower or bottom side 14. Positioned substantially equidistant between said upper and bottom sides and of substantially equal width therewith, is a partition or intermediate wall portion 15 which provides the structural member with two spaced longitudinal chambers or compartments, a first chamber designated as 16 and a second chamber designated as 17. The centrally disposed partition 15 extending along the length of the structural member 10 terminates short of each end of member 10 so as to provide a pair of chambers, an upper chamber designated as 18 and a lower chamber designated as 19. Provided along the front side 11 of structural member 10 and substantially adjacent each side of the centrally disposed partition 15 is a pair of longitudinal openings or slots 20 and 21 in open communication with chambers 16 and 17 respectively, said slots being substantially co-extensive in length with said chambers 16 and 17 and being of a width which is slightly less than the distance between said partition 15 and each of said upper and lower sides of member 10. Also as shown in the figures, an inwardly extending lip 22 is preferably provided along all the edges of the openings 20 and 21 to provide greater structural rigidity for the member 10. The structural member might be termed an E-shaped member.

A monorail 23 is secured or fastened along the entire length of the upper outer side 13 of the structural member 10, the monorail shown as preferably being located near or at the corner of the upper side adjacent the front side 11. Solid steel bar of ½ to 5/16 inch square may be used for the rail although other standard rail size bar members may be employed. The structural member 10 may be made of suitable steel plate or may be made of such a material as aluminum alloy or other light weight metal extrusions which have modulus characteristics adequate to withstand the load applied. The length of the monorail, that is, the length of the structural member is preferably 8 feet. However, the rail and its support member 10 may be made somewhat longer or may be made somewhat shorter than 8 feet without materially departing from the scope of the invention.

As shown in the figures, a travel wheel or wheel hook assembly 24 rides on the monorail 23. The wheel hook assembly 24 includes a grooved wheel 25, its bracket 26 and a carrying arm 27 provided with means such as an eye for engaging a meat hook 28.

The attachment of structural member 10 between two overhead monorail systems of different heights is preferably achieved by providing the extended end portions 29 of structural member 10 with pivotally mounted connecting members 30 shown here with a male connector 31. The engagement of said connector 31 of said member 30 with a suitable female connector carried by such other overhead monorail systems provides in essence a universal joint or coupling which facilitates connection or alignment of said structural member 10.

Included within the chambers of structural member 10 is an assembly comprising a pair of spaced and aligned sprockets 32 and 33 of equal size and a chain 34 therearound. As shown, one sprocket 32 is mounted within the upper chamber 18 and the other sprocket 33 is mounted within the lower chamber 19. The chain 34 extends around said sprockets and through the longitudinal chambers 16 and 17, the chain thus causing the sprockets to rotate in the same direction. Sprocket 33 is rotatably mounted by means of shaft 50 within chamber 19, and sprocket 32 is secured to one end of crankshaft 35, the other end thereof being secured to crank 36. One end of a connecting rod 37 is attached to crank 36 by means of a crank pin 38 while the other end is attached to a cross-bar 39 by means of a pin 40. The ends of said cross-bar are provided with hollow tubular members 41 and 42. Rod member 43 having a slightly smaller diameter than the inner diameter of tubular member 41 passes through said member 41 and is secured by suitable means 44 at or near its extremities to the back side 12 of structural member 10. Rod member 43 permits limited movement to tubular member 41 therearound. One extremity of piston rod 45 passes through tubular member 42 and is fixedly secured thereto while portions of the other end of piston rod 45 are contained within a suitable hydraulic or pneumatic system 46 which may be of any well-known construction. Piston means (not shown) are provided on a portion of piston rod 45 within said system 46. The system 46 illustrated represents a hydraulic system comprising a fluid containing cylinder 47, fluid conduit means 48, an orifice (not shown) and orifice control means 49. The system 46 is suitably secured to the back side 12 of structural member 10. As shown, rod member 43 and piston rod 45 are substantially parallel. The hydraulic system 46 operates so as to regulate the speed or rate of rotation of sprocket and hence the rate of travel of chain 34. Adjustments of the orifice may be made to suitably increase or decrease the rate of speed at which sprocket 32 and chain 34 may rotate or travel. Although specific members or means and arrangements thereof are illustrated for controlling or regulating the speed of sprocket 32, other well-known members and arrangements may also be utilized.

The chain 34 includes a pair of predeterminedly spaced carriage means or assemblies 52 and 53, carriage means 52 being carried by chain 34 within longitudinal chamber 16, and carriage means 53 being carried by chain 34 within longitudinal chamber 17. The preferred spacing of said carriage means is as shown in FIGURES 1 and 2, that is, when one carriage means is at the beginning of the downward path of travel in one longitudinal chamber, the other carriage means is at the end of the downward path of travel in the other longitudinal chamber. Each of said carriage means comprises an elongated hollow body or housing member 54 which is firmly secured at each end thereof to portions of chain 34. The length of the housing members 54 may be varied, however, one suitable length being 7 inches. The width of said housing members is preferably about the same as the width of said longitudinal chamber slots. The housing members 54 comprise two elongated parallel sides which are open and aligned with the longitudinal slots of structural member 10 and two elongated parallel sides, each side being provided with a slot 55, running along a substantial length of said side, the slots 55 being aligned and co-extensive in length and width. At the front end of said slots 55 or at a portion adjacent thereto a first shaft 56 is fixedly mounted, said shaft 56 having rotatably mounted at its extremities, which extend beyond or outside the housing member 54, a first pair of wheels or rollers 57. A second shaft 58 passing through said slots 55 and longitudinally movable therewithin has a second pair of wheels 59 rotatably mounted at its extremities which also extend beyond or outside the housing member 54.

Although the wheels are illustrated as being outside the housing member 54, it is possible to utilize an arrangement whereby said wheels are within the housing member 54.

A pair of pivotally mounted arms 60 and 61 are mounted within housing member 54 on shafts 56 and 58 respectively, said pair of arms being rotatable about an individual pivot pin 62. In FIGURE 4 the arms 60 and 61 are shown in the erected position with a wheel hook assembly 24 in engagement or contact with arm 61. In FIGURES 2, 9 and 10 the arms 60 and 61 are illustrated in the collapsed position. In order to prevent the collapsed arms 60 and 61 from accidentally erecting during the upward return travel of the carriage means, the arms are preferably constructed so that upon collapse, the pivot pin 62 lies below the center line 63 between shafts 56 and 58 such as shown in FIGURE 10.

To release the wheel hook assembly 24 at a lower portion of structural member 10, preferably at a portion near or adjacent the lower chamber 19, the collapse of the arms 60 and 61 from the erected position is accomplished by stop member 64 comprising plate 65 pivotally mounted by a pivot pin 67 upon a section of back side 12 and extending in part through a suitable opening (not shown) in said back side and into a longitudinal chamber. At least a pair of such stop members are provided, one for each longitudinal chamber to stop the travel of the carriage means contained therewithin and to collapse the arms of said carriage means. The plate 65 mounted parallel to the upper and lower sides of structural member 10 includes a section or part thereof extending into the longitudinal chamber, said section preferably having at the end thereof a depressed or arcuate shape 66 which is positioned in the path of travel of the wheels mounted on one side of said carriage means. As shown, stop members 64 are positioned parallel to and closely adjacent the upper and lower sides of structural member 10 and spaced a short distance from the lower chamber 19. Thus, plates 65 are located in the path of travel of the wheels adjacent the upper and lower sides of structural member 10. Each plate 65 is also preferably provided with a pair of predeterminedly spaced holes or openings 72a and 72b, the openings on the inner surface or side of plate 65 having an arcuate or socket-like portion 73a and 73b. Also carried by each plate 65 is a safety stop pin 74 which is positioned in line and equidistant between each pair of openings 72a and 72b in plate 65. Securely carried by the section of back side 12 between plates 65 is a pair of hollow members 75 in which there is located a pair of suitable ball members 76 between which is a spring member 77. The hollow members 75 extend between plates 65 so that ball members 76 carried thereby are capable of engaging the arcuate portions 73a and 73b of openings 72a and 72b. One opening of plate 65 is engaged by a ball member 76 at all times. The operations associated with the movement of plate 65 may be seen from a consideration of FIGURE 13. As shown, opening 72a is engaged by the ball engagement means and safety stop pin 74 is in contact with a portion of back side 12, thus preventing further movement of plate 65 in one direction. Upon the rotation of plate 65 as shown by the dotted lines, the opening 72a becomes disengaged from its ball while opening 72b engages its ball-engagement means. Safety stop pin 74 also rotates with plate 65 and contacts back side 12 when opening 72b becomes engaged, thus preventing further movement of plate 65 in the direction of rotation.

Figure 13:
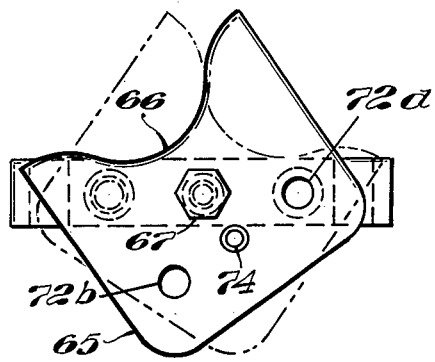
FIGURE 13 is a top view of one stop member for collapsing the arms of the carriage assembly.
Figure 14:
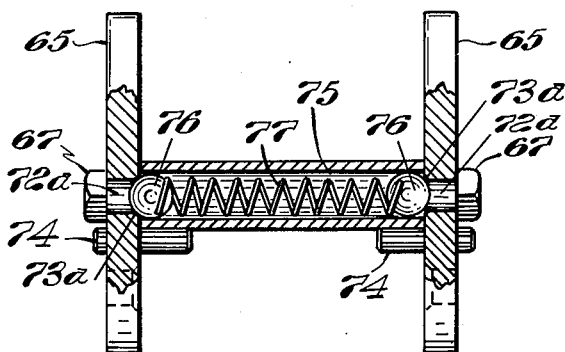
FIGURE 14 is a cross-section taken along the line 14—14 of FIGURE 12.

The termination of the travel of carriage means at the lower end of a longitudinal chamber and the collapse of arms 60 and 61 from the erected position simultaneously therewith is accomplished by a first wheel 57 engaging the arcuate portion 66 of plate 65 and rotating said plate as shown by the dotted lines in FIGURE 13 so as to provide a barrier to the passage of the second wheel 59. Since the second wheel 59 and the second shaft 58 joined thereto cannot move further once in contact with the rotated plate 65, unfinished downward movement of the other members of carriage means permitted by slots 55 results in the collapse of arms 60 and 61.

It should be mentioned that stop members 64 may be provided to engage the wheels adjacent the centrally disposed partition rather than the wheels adjacent the upper and lower sides of structural member 10. Likewise, stop members 64 may be provided to engage all the wheels.

In order to aid in the collapse of the arms there is preferably provided a spring member 68, a pair of such being shown, secured to the front side 11 of structural member 10 and in the paths of travel of said arms, said spring member preferably being positioned between the lower chamber 19 and stop member 64. The spring member 68 upon engagement or contact with the collapsing arms pushes them into the position illustrated in FIGURE 10.

In order to erect the collapsed arms in each of the longitudinal chambers at the upper end of structural member 10, that is, near or adjacent upper chamber 18, there is provided near said end an erecting member 69 shown here as a hook-like spring. The erecting member 69 suitably secured to back side 12 extends through an opening 70 in said back side and appreciably into a longitudinal chamber at a location which is substantially along the path of travel of the collapsed arms. Erecting member 69 upon contact with a pair of collapsed arms causes the arms to move or spring outwardly. In order to complete the erecting of the arms, there is fixedly secured along the path of travel of one of the wheels 59 and between the erecting member 69 and the upper chamber 18 a barrier member 71 shown more clearly in FIGURE 8. The termination of the travel of carriage means at the upper end of a longitudinal chamber and the completion of the erection of arms 60 and 61 from the collapsed position simultaneously therewith is accomplished by a second wheel 59 engaging the barrier member 71 and causing upon continued upward movement of the carriage means the erection of arms 60 and 61.

Another embodiment for regulating the speed of sprocket 32 and hence the rate of travel of chain 34 is illustrated in FIGURES 7 and 8. In this embodiment sprocket 32 is secured to shaft 78 which is rotatably mounted on suitable bearing systems 79 carried by the front and back sides of structural member 10. One extremity of shaft 78 passes into the hydraulic (or pneumatic) system 80 secured to the back side of structural member 10. The system 80 illustrated preferably represents a hydraulic system comprising a fluid e.g. oil-containing housing 81, a manifold 82, fluid conduit means 83, an orifice (not shown) and an orifice control means 84. The shaft 78 within the fluid-containing housing is provided with suitable means such as vanes or the like (not shown) so that rotation of shaft 78 may be controlled by the fluid. A closed circulatory system for the flow of fluid into and out of the housing 81 is provided by conduit means 83 comprising the channels or conduits in manifold 82 and the tubing connected thereto. Adjustments of the orifice size by means 84 may be made to increase or decrease the flow of fluid and thus the speed or rate of rotation of shaft 78 and sprocket 32 attached thereto.

The operation of the apparatus will now be described in order to provide a fuller understanding of the invention. The structural member 10 is attached between two overhead monorail systems of different heights by means of connecting members 30 such that sprocket 32 is at the upper or higher end of the inclined structural member 10. At the start of operations it is assumed that the carriage means 52 and 53 are as shown in FIGURES 1 and 2, that is, carriage means 52 being at the upper end of chamber 16 of member 10 with the arms 60 and 61 in the fully erected position and carriage means 53 being at the lower end of chamber 17 of member 10 with its arms 60 and 61 in the completely collapsed position such as is more fully shown in FIGURE 10. A wheel-hook assembly 24 having an animal carcass secured thereto is moved from the elevated or higher monorail system onto monorail 23 of member 10. The bracket 16 of wheel-hook assembly 24 contacts arm 61 extending outwardly from carriage means 52 and chamber 16 thus restraining the wheel-hook assembly from a free, rapid and dangerous movement down the inclined plane.

The heavy animal carcass seeking to move down the inclined plane exerts a substantial load or force upon the erected arms 60 and 61, resulting in movement of the carriage means 52, chain 34 and sprockets 32 and 33. The rate of this movement and hence the rate of descent or transport of the wheel-hook assembly 24 is regulated by the hydraulic system through suitable connections controls the rate of travel or speed of sprocket 32. As carriage means 52 moves downwardly in longitudinal chamber 16 with the wheel-hook assembly, carriage means 53 with its arms 60 and 61 in a completely collapsed position moves upwardly in longitudinal chamber 17. As first wheel 57 adjacent the upper side 13 moves into contact with the arcuate section 66 of stop member plate 65, it causes rotation of said plate so as to provide a barrier to the passage of second wheel 59 also adjacent the upper side 13. Since second wheel 59 cannot move further once in contact with the rotated plate, continued downward movement of the other members of carriage means 52, which is permitted due to slot 55, causes said arms to be straightened and then completely collapsed upon contact with spring member 68. Upon collapse of the arms no further downward movement of carriage means 52 takes place and the wheel-hook assembly is released and moved onto the lower overhead monorail system. At substantially the same time as arms 60 and 61 of carriage means 52 are being collapsed, the arms 60 and 61 of carriage means 53 riding upwardly in chamber 17 are being erected. Upon contact of these collapsed arms with erecting member 69, the arms are pushed or moved outwardly. The contact of second wheel 59 with barrier member 71 prevents further upward movement of wheels 59 and second shaft 58 so that upon continued upward movement of the other members of carriage means 53, which movement is permitted by slots 55, the arms 60 and 61 thereof are erected and ready to receive the next wheelhook assembly for downward movement. The operation is repeated, only now, carriage means 53 with its arms in the erected position moves downwardly while carriage means 52 with its arms in the collapsed position moves upwardly.

Since certain changes may be made in the above apparatus without departing from the scope of the invention herein involved, it is intended that all matter contained in the above description or shown in the accompanying drawings, shall be interpreted as illustrative and not in a limiting sense.

Having thus described my invention, I claim:

1. An overhead monorail system comprising an elongated structural member having a pair of longitudinal openings along one side thereof, said member having a monorail secured along the entire length of the upper side thereof for supporting a wheel and wheel hook assembly, said member having therewithin an assembly comprising a pair of spaced sprockets and a chain therearound, said assembly providing an elongated path of travel, one of said sprockets being connected to a fluid system for controlling the rate of rotation thereof, said chain including a pair of predeterminedly spaced carriage means, each carriage means comprising a housing member and a pair of pivotally mounted arms carried thereby which may be erected to engage the wheel hook assembly and collapsed to release the wheel hook assembly, means near one end of said member for erecting said arms and means near the other end of said member for collapsing said arms.

2. An overhead monorail system comprising an elongated structural member having a chamber at each end and a pair of longitudinal chambers extending therebetween, said member being provided along one side thereof with an opening for each of said longitudinal chambers, said openings being substantially co-extensive in length with said longitudinal chambers, a monorail secured substantially along the entire length of the upper side of said member for supporting a wheel and wheel hook assembly, sprocket means provided in each of said end chambers, one of said sprockets connected to a hydraulic system for controlling the rate of rotation of said sprocket, chain means around said sprockets and extending through said longitudinal chambers, said chain means including a pair of predeterminedly spaced carriage means, one of said carriage means being positioned within each of said longitudinal chambers, said carriage means comprising an elongated housing member and a pair of pivotally mounted arms carried thereby which may be erected to engage the wheel hook assembly and collapsed to release the wheel hook assembly, means near one end of said member for erecting said arms and means near the other end of said member for collapsing said arms.

3. The overhead monorail system of claim 2 wherein said structural member is provided with connecting means at each end thereof for joining said member between two other overhead monorail systems.

4. An overhead monorail system comprising an elongated structural member having a chamber at each end and a pair of longitudinal chambers extending therebetween, said member being provided along one side thereof with an opening for each of said longitudinal chambers, said openings being substantially co-extensive in length with said longitudinal chambers, a monorail secured substantially along the entire length of the upper side of said member for supporting a wheel and wheel hook assembly, sprocket means provided in each of said end chambers, one of said sprockets being connected to a fluid system for controlling the rate of rotation of said sprocket, chain means around said sprockets and extending through said longitudinal chambers, said chain means including a pair of predeterminedly spaced carriage means, one of said carriage means being positioned within each of said longitudinal chambers, said carriage means comprising an elongated housing member provided with a pair of slots extending along parallel longitudinal sides thereof, first shaft means joining a first pair of wheels and fixedly secured near one end of said housing member, second shaft means joining a second pair of wheels and extending through said slots, a jair of arms pivotally joined together at one end thereof and at the other end each arm being pivotally joined to said wheel shafts, collapsing means near one end of said member for engaging at least one of said second wheels and for causing said pivotally mounted arms to be collapsed to release the wheel hook assembly, and erecting means near the other end of said member for engaging at least one of said second wheels and causing said pivotally mounted arms to be erected to engage the wheel hook assembly.

5. The overhead monorail system of claim 4 wherein one of said sprockets is connected to crank means which in turn is connected to rod means, said rod means connecting said crank means with a hydraulic system.

6. An overhead monorail system comprising an elongated structural member having a chamber at each end and a pair of longitudinal chambers extending therebetween, said member being provided along one side thereof with an opening for each of said longitudinal chambers, said openings being substantially co-extensive in length with said longitudinal chambers, a monorail secured substantially along the entire length to the upper side of said member for supporting a wheel and wheel hook assembly, sprocket means provided in each of said end chambers, one of said sprockets being connected to a hydraulic system for controlling the rate of rotation of said sprocket, chain means around said sprockets and extending through said longitudinal chambers, said chain means including a pair of predeterminedly spaced carriage means, one of said carriage means being positioned within each of said longitudinal chambers, said carriage means comprising an elongated housing member having a pair of open sides aligned and in open communication with said longitudinal chamber opening, and a pair of parallel longitudinal sides, each of said latter sides being provided with a slot extending along a substantial portion of the length thereof, said slots being aligned, first shaft means joining a first pair of wheels and fixedly secured near one end of said housing member, second shaft means joining a second pair of wheels and extending through said slots, a pair of arms pivotally joined together at one end thereof and at the other end each arm being pivotally joined to one of said wheel shafts, collapsing means near one end of said member for engaging at least one of said second wheels and for causing said pivotally mounted arms to be collapsed to release the wheel hook assembly, and erecting means near the other end of said member for engaging at least one of said second wheels and causing said pivotally mounted arms to be erected to engage the wheel hook assembly.

7. The overhead monorail system of claim 6 wherein said structural member is provided with connecting means at each end thereof for joining said member between two other overhead monorail systems.

8. The overhead monorail system of claim 6 wherein said collapsing means comprises a pivotally mounted plate having a depressed section which is positioned in the path of travel of at least one of said first wheels so as to receive said first wheel and to pivot said plate to prevent further movement of said second wheels and second shaft.

9. The overhead monorail system of claim 8 wherein there is provided in conjunction with said collapsing means, a spring member for engaging the arms as they are being collapsed so as to cause said arms to be completely collapsed.

10. The overhead monorail system of claim 6 wherein said erecting means comprises, in conjunction, a spring member for engaging the collapsed arms and moving said arms outwardly toward said longitudinal chamber opening, and a barrier member in the path of travel of at least one of said second wheels to prevent further movement of said second wheels so as to complete the erection of said arms partially erected by said spring member.

References Cited in the file of this patent

UNITED STATES PATENTS

| | | |
|---|---|---|
| 490,666 | Layman | Jan. 31, 1893 |
| 683,370 | Acklin | Sept. 24, 1901 |
| 690,814 | Acklin | Jan. 7, 1902 |